United States Patent
Chang

(10) Patent No.: US 6,634,586 B1
(45) Date of Patent: Oct. 21, 2003

(54) ANTI-REVERSIONAL MECHANISM FOR TROLLING REEL

(76) Inventor: Liang-Jen Chang, No. 132, Fu-I Rd., I-Hsin Li, Tai-Ping City, Taichung Hsien (TW)

( * ) Notice: Subject to any disclaimer, the term of this patent is extended or adjusted under 35 U.S.C. 154(b) by 3 days.

(21) Appl. No.: 10/186,622

(22) Filed: Jul. 2, 2002

(51) Int. Cl.⁷ .............................................. A01K 89/02
(52) U.S. Cl. ....................... 242/247; 242/264; 242/296; 242/297; 242/299
(58) Field of Search ................................ 242/247, 245, 242/257, 264, 296, 297, 299, 300, 301

(56) References Cited

U.S. PATENT DOCUMENTS

| | | | | |
|---|---|---|---|---|
| 2,548,317 A | * | 4/1951 | MacBlane | 242/264 |
| 4,288,046 A | * | 9/1981 | Morimoto et al. | 242/247 |
| 6,098,908 A | * | 8/2000 | Ng | 242/246 |
| 6,189,822 B1 | * | 2/2001 | Ikuta | 242/296 |
| 6,193,182 B1 | * | 2/2001 | Capra | 242/292 |
| 6,517,021 B2 | * | 2/2003 | Ikuta | 242/247 |

* cited by examiner

*Primary Examiner*—Emmanuel Marcelo

(57) ABSTRACT

An anti-reversional mechanism for a trolling reel is to provide a ratchet wheel on a pressing wheel of the trolling reel, and two pawl members detachably engaged with the ratchet wheel for preventing the pressing wheel from reversional rotation. Each of the pawl members has an elongated slot. A control ring is elastically clamped on the periphery of the pressing wheel and has two driving rods respectively received in the elongated slots of the pawl members. Since the orientation of the elongated slot and the displacement direction of the control ring form a predetermined included angle, the pawl members are driven by the control rods of the control ring to be disengaged with said ratchet wheel while the pressing wheel rotates in a right direction such that the pressing wheel can rotate freely.

5 Claims, 4 Drawing Sheets

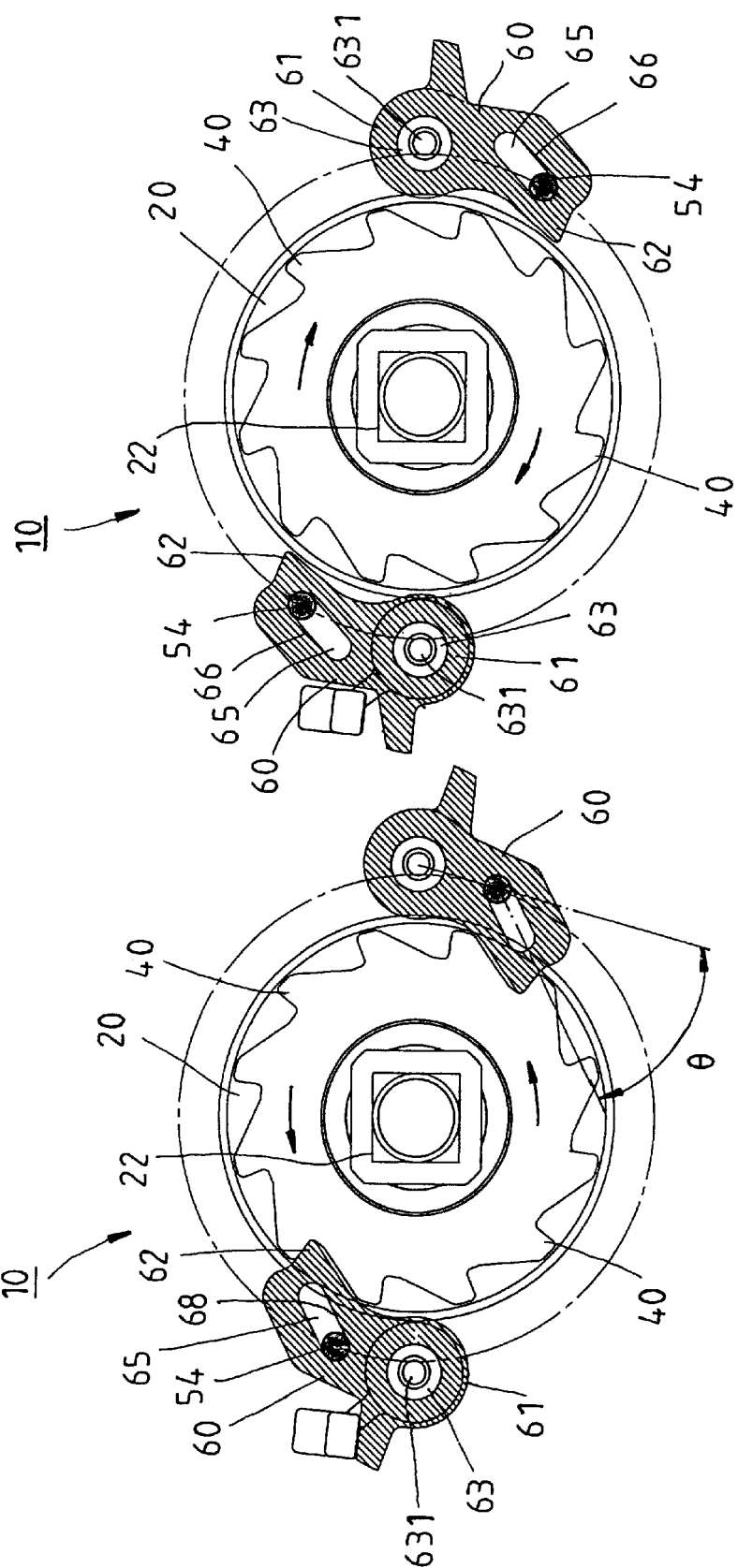

ANTI-REVERSIONAL MECHANISM FOR TROLLING REEL

FIELD OF THE INVENTION

The present invention relates generally to a fishing tool, and more particularly to an anti-reversional mechanism for a trolling reel, which keeps silent when in use.

BACKGROUND OF THE INVENTION

A conventional trolling reel uses a ratchet and two pawls to provide an anti-reversional function to a winding hub of the trolling reel which is used for winding a fishing line. The trolling reel further provides two springs respectively pushing the pawls to make them engaged with the ratchet. But, when user turns the winding hub forwards, the pawls will impact the ratchet repeatedly to provide click sound broadcasting into water via the fishing line. Sometime, it will scare fishes away.

SUMMARY OF THE INVENTION

The primary objective of the invention is to provide an anti-reversional mechanism for a trolling reel, which keeps silent when the anti-reversional mechanism is in function.

According to the objective of the invention, an anti-reversional mechanism is adapted to be installed in a trolling reel. The trolling reel has a housing, a main shaft rotatably mounted in said housing and coupled with a crank, at least one main gear fixedly mounted on the main shaft, a wheel shaft rotatably mounted in said housing and substantially paralleled to said main shaft, a winding hub rotatably mounted on said wheel shaft for winding a fishing line thereon, at least a second gear fixedly mounted on said wheel shaft and meshed with said main gear, a pressing wheel coupled with said second gear to be turned with said second gear, and friction means disposed between said pressing wheel and said winding hub for providing friction force in between said pressing wheel and said winding hub such that the pressing wheel can drive said winding hub to turn with said pressing wheel. The anti-reversional mechanism comprises a ratchet wheel provided at an end of said pressing wheel, a control ring and at least one pawl member. The control ring has a split such that the control ring is elastically clamped on the periphery of the pressing wheel, and at least one driving rod. The pawl member has one end pivoted to said housing, an other end detachably engaged with said ratchet wheel for providing said pressing wheel an anti-reversional effect, and an elongated slot for receiving said driving rod of said control ring. The driving rod shifts along said elongated slot for driving the pawl member to be engaged/disengaged with the ratchet wheel subject to the rotation direction of the pressing wheel when the pressing wheel rotates.

BRIEF DESCRIPTION OF THE DRAWINGS

FIG. 4 and FIG. 5 are perspective view of the prefer embodiment of the present invention, showing the trolling reel in working.

DETAIL DESCRIPTION OF THE INVENTION

Figure 1:
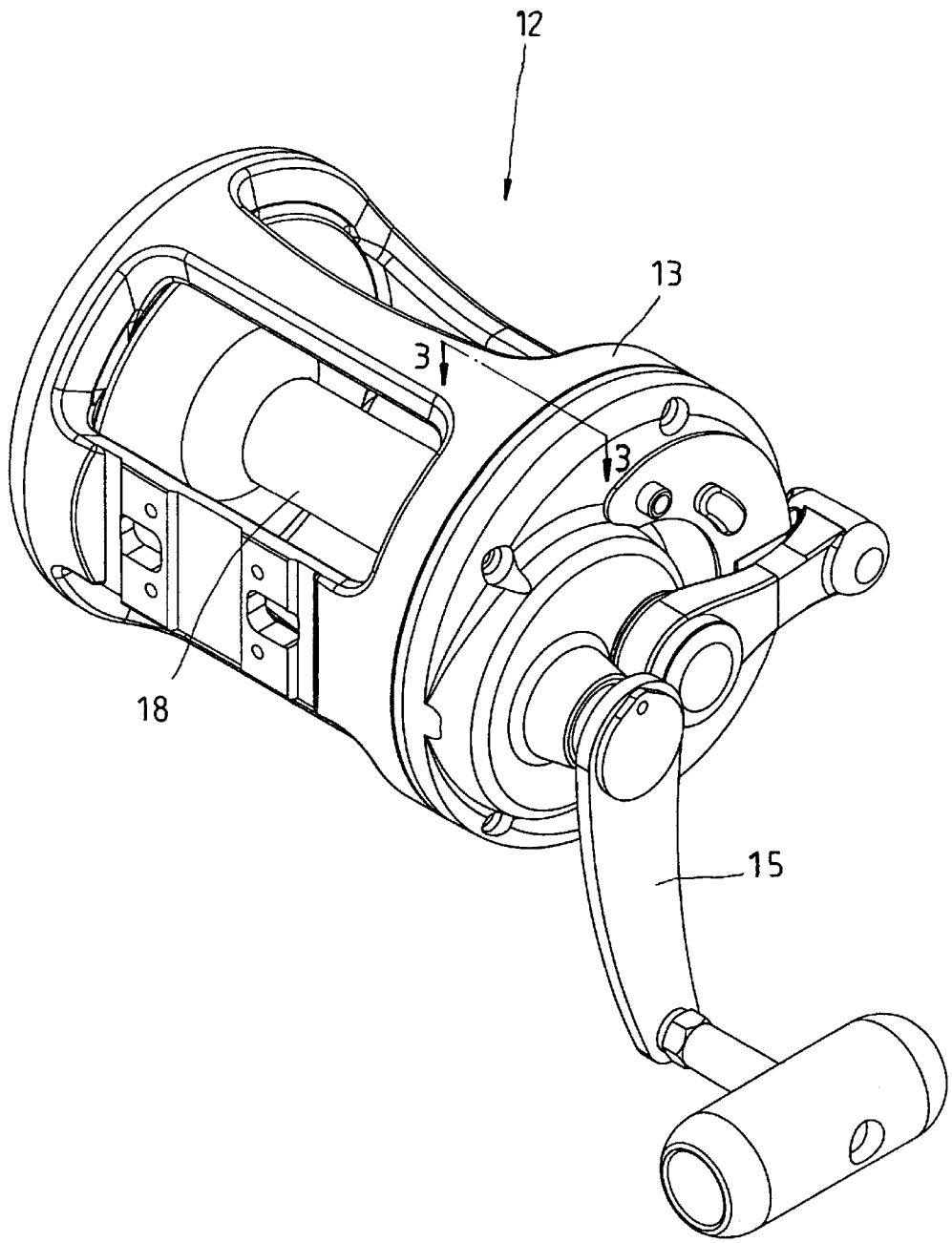
FIG. 1 is a perspective view of a prefer embodiment of the present invention.
Figure 2:
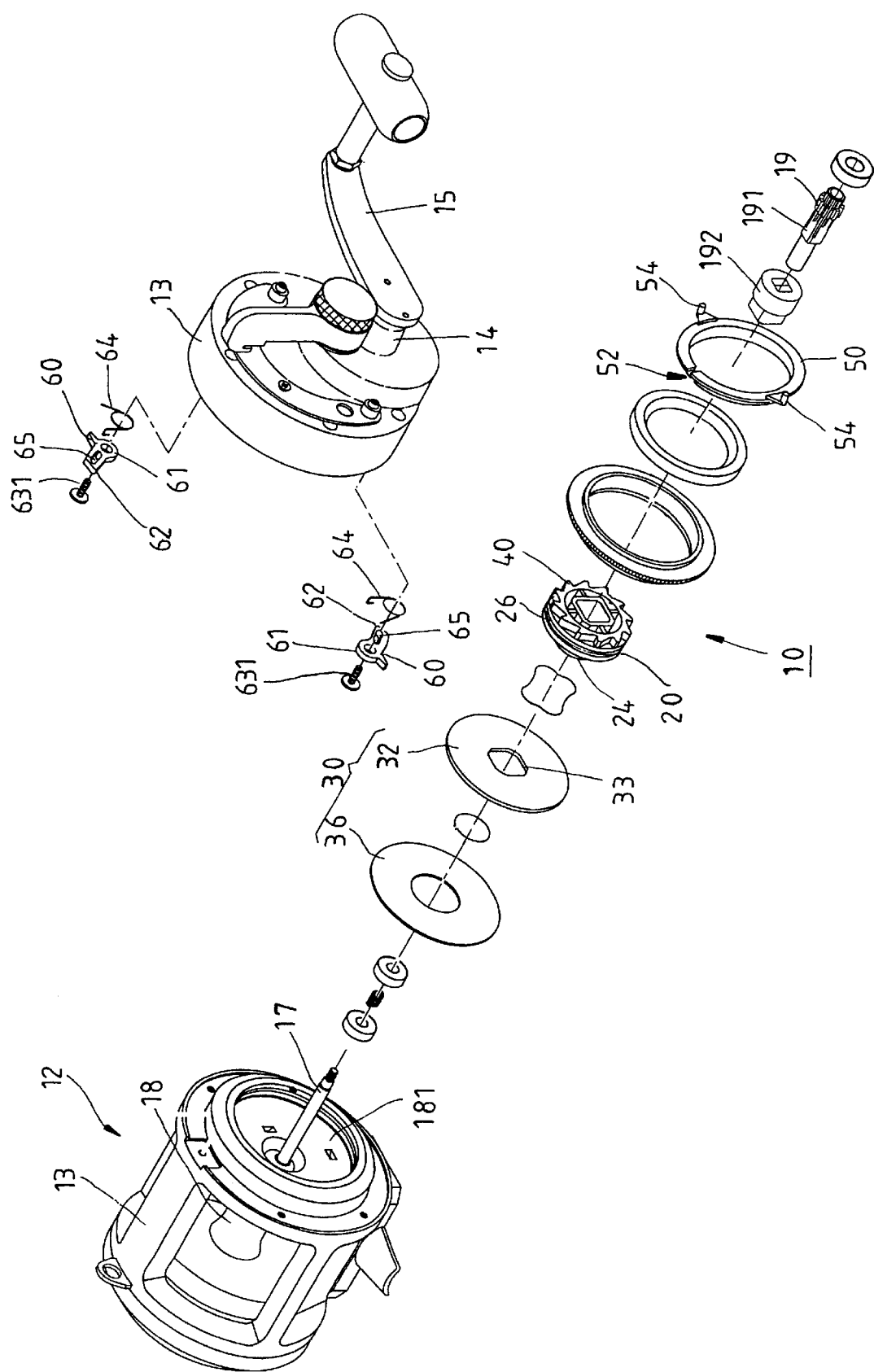
FIG. 2 is an exploded view of the prefer embodiment of the present invention.
Figure 3:
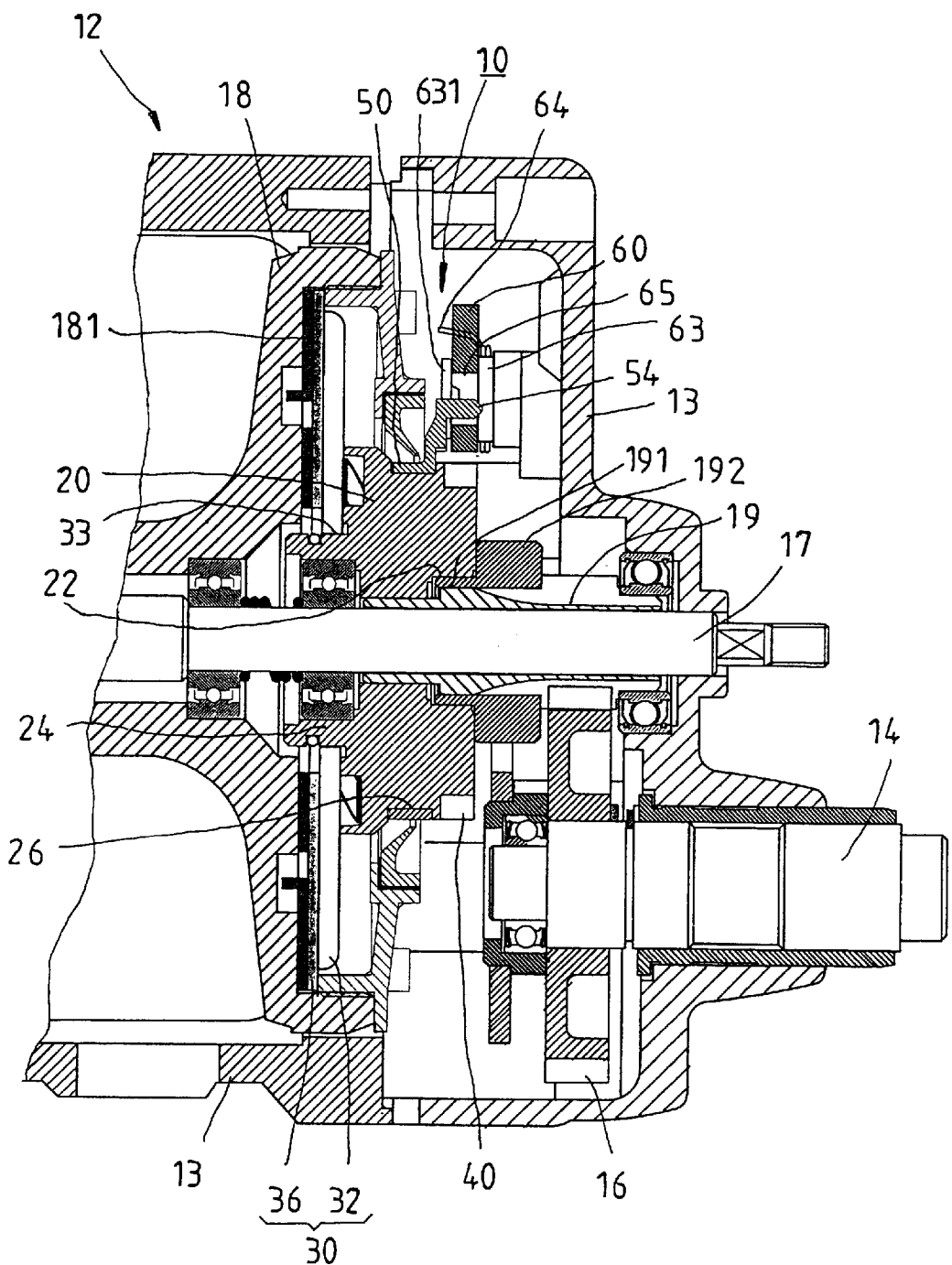
FIG. 3 is a sectional view along 3—3 line in FIG. 1.

Please refer to FIGS. 1–5, an anti-reversional mechanism 10 provided by the prefer embodiment of the present invention is adapted to be installed in a trolling reel 12. The trolling reel 12 comprises a housing 13, a main shaft 14 rotatably mounted in the housing 13, a crank 15 mounted on an end of the main shaft 14 to turn the main shaft 14 to rotate, a main gear 16 secured on the main shaft 14 to turn with it, a wheel shaft 17 rotatably mounted in the housing 13 and being parallel to the main shaft 14, a winding hub 18 rotatably mounted on the wheel shaft 17 for winding a fishing line thereon, a second gear 19 firmly mounted on the wheel shaft 17 and meshed with the main gear 16, a pressing wheel 20 coupled with the second gear 19 to turn with it, friction means 30 provided at where between the pressing wheel 20 and the winding hub 18 for providing a friction therebetween to make them turning together.

The pressing wheel 20 has a rectangular locking hole 22 at the central thereof. The second gear 19 has a locking portion 191 at a side thereof which is a rectangular rod to be inserted into the locking hole 22 of the pressing wheel 20 to couple the pressing wheel 20 with the second gear 19 and to make them can turn together. In this prefer embodiment, a coupling device 192, which is a column having a rectangular hole at the central and a rectangular rod at an end thereof, couples the pressing wheel 20 with the second gear 19. It also can provide two sets of the main gears and the second gears to make the trolling reel 12 of the present invention can change speed. Since they are not the main characters of the present invention, further description is not necessary.

The friction means 30 is composed of a first friction washer 32 and a second friction washer 36. The first friction washer 32 is a round plate and has a rectangular opening 33 at the central thereof, such that the first friction washer 32 can be engaging to a rectangular rod 24 of the pressing wheel 20 to make them turning together. The second friction washer 36 is a round plate too and is attached on an end surface 181 of the winding hub 18. While the pressing wheel 20 pushes the first friction washer 32 to make it pressing the second friction washer 36, a friction will be provided between the first and the second friction washers 32 and 36 to make the pressing wheel 20 can drive the winding hub 18 to turn. In operating, user can turn the crank 15 to make the main shaft 14 and the main gear 16 to turn. In the meantime, the main gear 16 will drive the second gear 19 to turn. Then, the second gear 19 will drive the winding hub 18 to turn via the coupling device 192, the pressing wheel 20 and the friction means 30.

The anti-reversional mechanism 10 comprises a ratchet wheel 40, a control ring 50 and two pawl members 60.

The ratchet wheel 40 is provided at a side of the pressing wheel 20. The pressing wheel 20 is provided with an annular slot 26 at the annular surface thereof. The control ring 50 is received in the annular slot 26 of the pressing wheel 20. The control ring 50 has a split 52 such that the control ring can be elastically clamped on the periphery of the pressing wheel 20. The control ring 50 further has two driving rods 54 extending along the axial orientation thereof.

Each pawl member 60 has a first end 61 and a second end 62. The pawl member 60 is pivoted to the housing 10 at the first end 61 thereof via a rod 63 having an end thereof secured to the housing 10 and the other end thereof pivoted to the pawl member 60 by a screw 631. Two torsional springs 64 are provided to make the second ends 62 of the pawl members 60 turning toward the ratchet wheel 40, such that the pawl members 60 are engaged with the ratchet wheel 40 at initial. Each pawl member 60 further has an elongated slot 65 to receive the relative driving rod 54 therein. The elongated slot 65 defines a first side 66 and a second side 67 at opposite ends thereof, wherein the first side 66 is away from the ratchet wheel 40 and the second side 67 is closing to the ratchet wheel 40. There is an included angle θ between the displacement direction of the driving rod 54 of the control ring 50 and the orientation of the elongated slot 65.

In operating, please refer to FIG. 4, when the pressing wheel 20 is turned clockwise, the control ring 50 will initially turn with the pressing wheel. At this moment, the driving rods 54 of the control ring 50 will press the first sides 66 of the elongated slots 65 to make the second ends 62 of the pawl members 60 depart from the ratchet wheel 40, such that the pressing wheel 20 can rotate freely without click sound. Because the control ring 50 and the pressing wheel 20 are contacted with each other and have friction force therebetween, the driving rods 54 of the control ring 50 can continually press the pawl members 60 to keep the pawl members 60 from engaging with the ratchet wheel 40.

On the contrary, when the pressing wheel 20 is turned counterclockwise, the control ring 50 will turn with the pressing wheel 20 and the driving rods 54 of the control ring 50 will press the second sides 67 of the elongated slots 65 to make the second ends 62 of the pawl members 60 engaged with the ratchet wheel 40, such that pressing wheel 20 can not rotate.

In other words, the pawl members 60 are engaged with the ratchet wheel 40 to stop the pressing wheel 20 to turn when the pressing wheel 20 is adapted to turn along a direction. But, when turns the pressing wheel 20 along the opposite direction, the pawl members 60 will depart from the ratchet wheel 40 to make the pressing wheel 20 can turn freely and silently.

It has to mention here that the pawl members 60 are mainly driven to swing by the driving rods 54 of the control ring 50 rather than by the torsional springs 64. The present invention will work without the torsional springs 64. In addition, one pawl member or three (or more) pawl members also can complete the function of the present invention.

What is claimed is:

1. An anti-reversional mechanism adapted to be installed in a trolling reel having a housing, a main shaft rotatably mounted in said housing and coupled with a crank, at least one main gear fixedly mounted on the main shaft, a wheel shaft rotatably mounted in said housing and substantially paralleled to said main shaft, a winding hub rotatably mounted on said wheel shaft for winding a fishing line thereon, at least a second gear fixedly mounted on said wheel shaft and meshed with said main gear, a pressing wheel coupled with said second gear to be turned with said second gear, and friction means disposed between said pressing wheel and said winding hub for providing friction force in between said pressing wheel and said winding hub such that the pressing wheel can drive said winding hub to turn with said pressing wheel, said anti-reversional mechanism comprising:

a ratchet wheel provided at an end of said pressing wheel;

a control ring having a split such that the control ring is elastically clamped on the periphery of the pressing wheel, and at least one driving rod; and at least one pawl member having an end pivoted to said housing, an other end detachably engaged with said ratchet wheel for enabling said pressing wheel to be rotated in one direction and can not be rotated in a reversional direction, and an elongated slot for receiving said driving rod of said control ring.

2. The anti-reversional mechanism as defined in claim 1, wherein the housing is provided with a rod for pivoting the end of said pawl member thereon and a spring sleeved on the rod for driving the other end of said pawl member turning toward said ratchet wheel.

3. The anti-reversional mechanism as defined in claim 1, wherein said control ring has two of said driving rods and there are two of said pawl members.

4. The anti-reversional mechanism as defined in claim 1, wherein said control ring is clamped on an annular slot provided at the periphery of the pressing wheel.

5. The anti-reversional mechanism as defined in claim 1, wherein there is an included angle between the displacement direction of said driving rod of said control ring and the orientation of said elongated slot of said pawl member.

* * * * *